March 8, 1960 F. H. DRAKE 2,927,795

PHONOGRAPH TURNTABLE ASSEMBLY

Filed May 28, 1956 2 Sheets-Sheet 1

INVENTOR.
FREDERICK H. DRAKE
BY
Morgan, Finnegan, Durham & Pine
ATTORNEYS.

March 8, 1960 F. H. DRAKE 2,927,795

PHONOGRAPH TURNTABLE ASSEMBLY

Filed May 28, 1956 2 Sheets-Sheet 2

INVENTOR.
FREDERICK H. DRAKE
BY
Morgan, Finnegan, Durham & Pine
ATTORNEYS.

United States Patent Office 2,927,795
Patented Mar. 8, 1960

2,927,795

PHONOGRAPH TURNTABLE ASSEMBLY

Frederick H. Drake, Boonton, N.J.

Application May 28, 1956, Serial No. 587,871
2 Claims. (Cl. 274—9)

The invention relates to phonograph turntable units and more particularly to a mounting device for reducing rumble resulting from the transmission of mechanical vibration from the mounting board to the pick-up arm.

It is the present practice in most high quality turntable assemblies to mount the record turntable, the driving motor and pick-up arm on the same mounting board as a unit. In order to minimize the transmission of mechanical vibrations from the motor to the pick-up arm, mechanical vibration filters are usually interposed between the driving motor and the mounting board. However, in spite of this and other precautions, some spurious vibrations are always present in the mounting board of even the best turntable assemblies and do reach the pick-up arm resulting in the addition of spurious frequencies to the desired reproduction. Such spurious frequencies, or "rumble" are in the approximate range of from 20 to 200 cycles per second and although they may not always be heard directly by the human ear they tend to "muddy" the reproduction of the desired record material and hence increase listening fatigue.

Various proposals have been made to correct this condition. One approach has been to incorporate an electric "rumble" filter in the amplifying system. While such filters do reduce the "rumble" they are objectionable in that they reduce the desired low frequency sounds from the record as well.

Another suggestion has been to mount the pick-up arm somewhere other than on the mounting board, but this solution has the drawback of destroying the unitary structure of the turntable assembly—a very important consideration as this assembly is widely sold as one component of a record playing system.

My invention solves the problem of isolating the base of the pick-up arm from the residual vibrations of the mounting board without having the drawbacks of the previously discussed devices. My solution provides a novel supporting structure for the pick-up arm which substantially eliminates relative motion between the base of the arm and the turntable which would otherwise result from such residual vibrations in the mounting board, without, however, destroying the unitary character of the turntable assembly or interfering with the reproduction of the full audible range of desired frequencies from the record.

Briefly and generally, the invention comprises a turntable assembly in which the bearing housing for the turntable shaft and the driving motor are mounted on the same mounting board. An auxiliary supporting member for the pick-up arm is provided and this member is so constructed and attached to the mounting board as substantially to eliminate residual "rumble." Preferably one end of the supporting member is secured to the mounting board as closely as possible to the bearing housing for the turntable shaft, and its opposite end is secured to the base of the pick-up arm. By securing the pick-up arm supporting member to the mounting board only adjacent the turntable shaft, it is connected to the mounting board at a region effectively rumble-free (except for "rumble" vibrations which are rotational in the horizontal plane about the axis of the shaft). This relative freedom from "rumble" vibration in that region is due to the inertia of the massive turntable. Additionally, the supporting member for the pick-up arm is constructed substantially rigid except for stresses between the two ends in a horizontal plane at right angles to its longitudinal axis. In one successful arrangement I accomplished this by dividing the supporting member into two separate parts secured together by thin flexible strips of spring material so that substantial relative horizontal displacement at right angles to the longitudinal axis may occur between the separate parts for relatively small stresses. In other words, the arm is constructed so as to be highly compliant with respect to this one type of stress between its parts and substantially rigid for all other types.

Such construction results in a very low natural frequency of vibration for the base of the pick-up arm in a horizontal plane. The exact natural frequency of vibration depends on the mass of this base plus the mass of the associated end of the supporting member and the stiffness of the spring strips which join together the parts of the supporting member. The essential requirement is that this natural frequency be substantially lower than that of the lowest rumble frequency involved so that effective mechanical "filtering out" of all "rumble" frequencies is achieved.

With such construction, fairly large motion of the base of the pick-up arm may be produced in manipulating the arm preparatory to record playing. If this is considered objectionable, damping means may be introduced between the two parts of the supporting member. In one successful construction these have taken the form of narrow strips of tape, or like pliable non-resilient members, attached to both parts.

It will be understood that the foregoing general description and the following detailed description as well are exemplary and explanatory of the invention but are not restrictive thereof.

Figure 1:
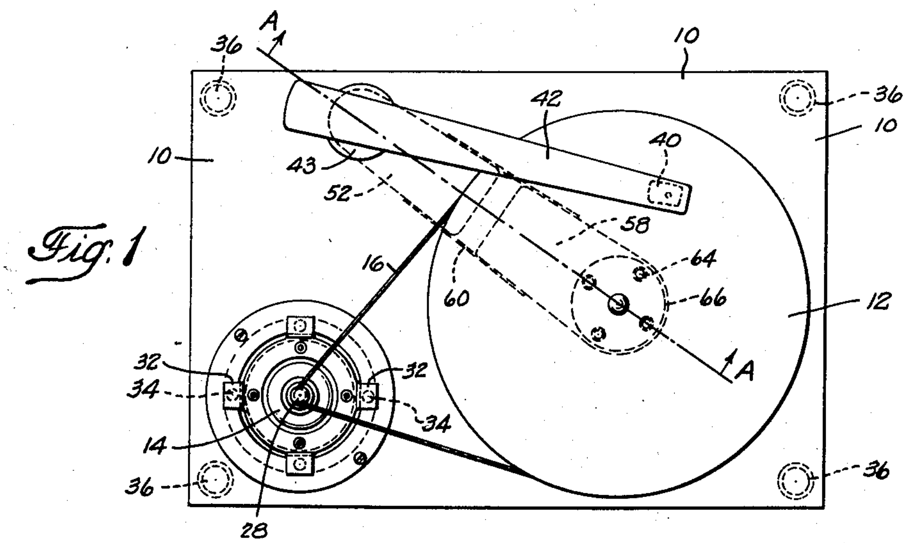
Fig. 1 is a plan view of a turntable unit or assembly embodying the teachings of applicant's invention.
Figure 2:
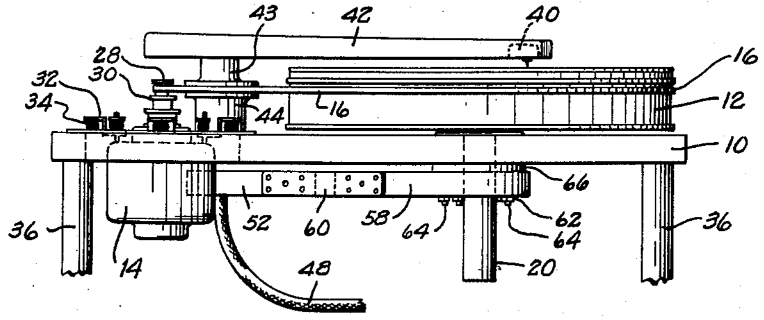
Fig. 2 is a side elevational view of the structure shown in Fig. 1.
Figure 3:
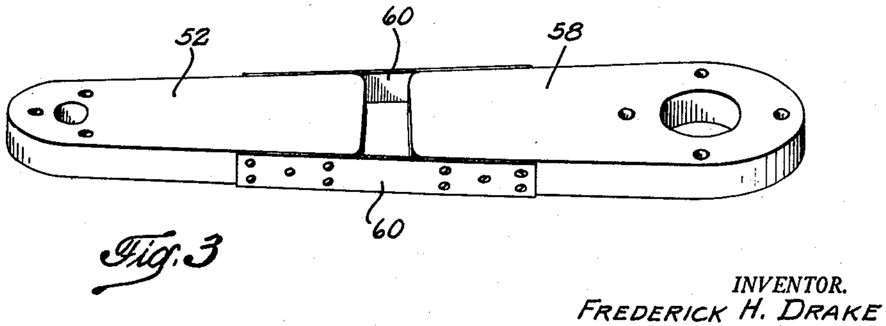
Fig. 3 is a perspective view of a detail of the construction.
Figure 4:
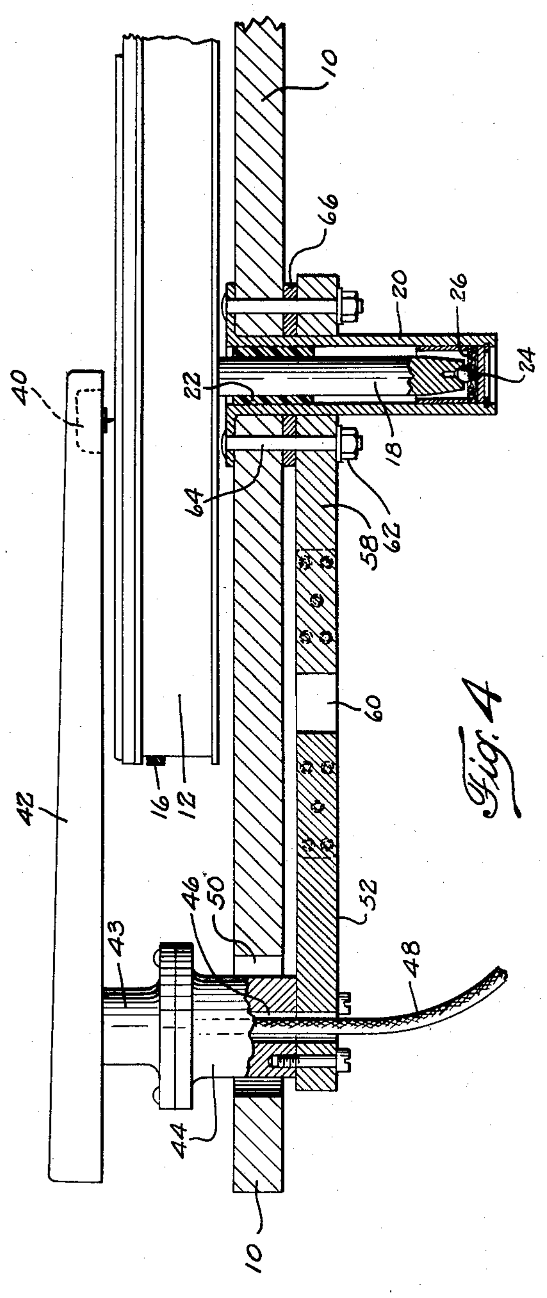
Fig. 4 is a sectional view taken along the line A—A looking in the direction of the arrows.

Referring now to the drawings which illustrate present preferred embodiments of the invention there is shown a turntable assembly comprising a mounting board 10 upon which is mounted the rotatable turntable 12 for the records and a driving motor 14 for driving the turntable through a continuous belt 16. The turntable 12 for the records is pressed on a vertically arranged shaft 18 (Fig. 4) that extends downwardly through the mounting board 10 into a bearing housing 20 passing through a bearing 22 situated at the top of the housing and resting upon a thrust ball 24 mounted in a thrust plate 26. The driving motor 14 is arranged so that its shaft 28 is in vertical parallelism with the shaft 18 of the turntable 12 and the end of shaft 28 is provided with a three step pulley 30 whereby the speed of the record turntable may be varied. The motor 14 is not secured directly to the mounting board 10 but is provided with brackets 32 which are secured to the casing of the motor and to the mounting board 10 by means of rubber dampers 34. Four legs 36 are provided for the mounting board 10, and they may be equipped with suitable vibration-damping means of any conventional design (not shown).

The pick-up arm 42 with pick-up and stylus 40 are pivotally disposed adjacent one side of the mounting board 10 and are adapted to swing through an arc passing a point outside the circumference of a record on the turntable 12 to a point close to the center of the record. The base 43 of the pick-up arm 42 is secured to an intermediate member 44 and both contain a passageway 46 to accommodate the electrical lead 48 to the pick-up arm. The intermediate member 44 passes through an access opening 50 in the mounting board 10; the diameter of this access opening 50 being substantially larger than the diameter of intermediate member 44 so there is no contact between the mounting board and the intermediate member. At its opposite end, the intermediate member 44 of the pick-up arm assembly is secured to one end 52 of an auxiliary supporting member having the novel features heretofore referred to.

The auxiliary supporting member 52—60—58 is relatively long and narrow and generally rectangular in cross-section although it may be somewhat tapered as shown in the drawings, and comprises two separate rigid parts 52 and 58 preferably joined together at their sides by means of thin strips of spring material 60 so that relative horizontal displacement between the parts may occur in the desired direction. While one part 52 of the auxiliary supporting member is thus secured to and supports the member 44 of the pick-up arm assembly the other part 58 of the supporting member is mounted as firmly as possible to bearing housing 20 of the turntable bearing mounting, as by means of the nuts 62 and bolts 64 extending through the mounting board and flange of housing 20. An annulus 66 limits contact between parts 58 and 10 to the area of the ring, that is, to the part of the mounting board 10 which is effectively stabilized against rumble (for all except one direction of vibration) by the inertia of the relatively massive turntable acting through shaft 18, bearings 24 and 22 and bearing housing 20. The one direction of rumble vibration to which 58 is exposed is rotational in a horizontal plane around the axis of the turntable shaft 18. If a rigid arm were used instead of the spring-connected two-part auxiliary supporting member 52—60—58, the base of the pick-up arm would thus be subject only to rumble vibration in a horizontal plane at right angles to the longitudinal axis of the supporting member. The two-part flexible construction eliminates transmission of this type of rumble vibration from part 58 to part 52 by the interposition of mechanical filtering springs 60 in the manner shown.

While, as shown, the supporting member is preferably and conveniently disposed beneath the under surface of the mounting board, it will be obvious that the same rumble-eliminating effect could be obtained by disposing the supporting member above the mounting board and overhanging the assembly so as to support the pick-up arm.

Figure 5:
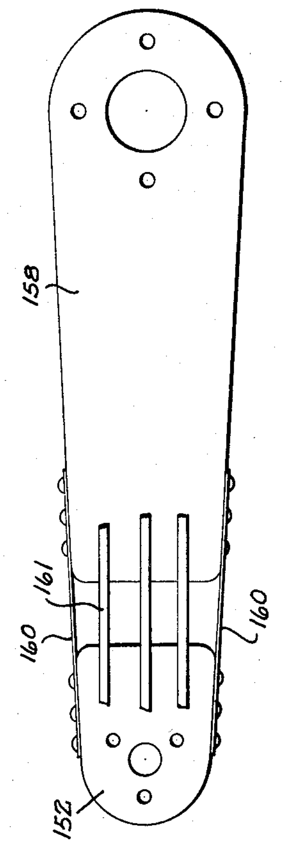
Fig. 5 is a detailed plan view showing modifications in the various parts of the supporting arm.

In a modified form of the auxiliary supporting member 152—160—158 shown in Fig. 5 the proportions and dimensions of the separate parts 152 and 158 are varied so that one part 158 is very much longer than the other part 152. This permits the use of more flexible and effective springs 160 for equivalent vertical support at the base of the pick-up arm. Narrow strips of tape 161 are shown mounted between parts 152 and 158 to restrict the motion due to shock excitation of the base of the pick-up arm in service use.

The invention in its broader aspects is not limited to the specific mechanisms shown and described but departures may be made therefrom within the scope of the accompanying claims without departing from the principles of the invention and without sacrificing its chief advantages.

What is claimed is:

1. A phonograph turntable assembly comprising a mounting board, a record turntable and shaft, a bearing housing for the shaft, driving motor mounted on the mounting board, a pick-up arm and an auxiliary supporting member having the pick-up arm mounted thereon, said supporting member being rigidly clamped to the bearing housing for the turntable shaft in a plane substantially parallel to the mounting board so as to permit with respect to the turntable shaft only rotary movement in a horizontal plane, said supporting member being constructed in two parts flexibly joined together to permit relative movement therebetween in a horizontal plane, and means on the supporting member for attenuating said movement before it reaches the pick-up arm.

2. A phonograph turntable assembly comprising a mounting board, a record turntable and shaft, a bearing housing for the shaft, driving motor mounted on the mounting board, a pick-up arm and an auxiliary supporting member having the pick-up arm mounted thereon, said supporting member being rigidly clamped to the bearing housing for the turntable shaft in a plane substantially parallel to the mounting board so as to permit with respect to the turntable shaft only rotary movement in a horizontal plane, said supporting member being constructed in two parts flexibly joined together to permit relative movement therebetween in a horizontal plane, and a mechanical damping means interposed between the separate parts of the supporting member.

References Cited in the file of this patent

UNITED STATES PATENTS

| | | |
|---|---|---|
| 1,875,848 | Burt | Sept. 6, 1932 |
| 2,357,034 | Thompson et al. | Aug. 29, 1944 |
| 2,580,071 | Bunyard | Dec. 25, 1951 |

FOREIGN PATENTS

| | | |
|---|---|---|
| 740,896 | Germany | Oct. 11, 1944 |